(12) United States Patent
Kim et al.

(10) Patent No.: US 12,717,097 B2
(45) Date of Patent: Aug. 25, 2026

(54) OPTICAL MODULE

(71) Applicant: LESSENGERS Inc., Pohang-si (KR)

(72) Inventors: Taeyong Kim, Gyeonggi-do (KR); Chongcook Kim, Seoul (KR)

(73) Assignee: LESSENGERS Inc., Pohang-si (KR)

( * ) Notice: Subject to any disclaimer, the term of this patent is extended or adjusted under 35 U.S.C. 154(b) by 565 days.

(21) Appl. No.: 18/139,389

(22) Filed: Apr. 26, 2023

(65) Prior Publication Data

US 2023/0367085 A1 Nov. 16, 2023

(30) Foreign Application Priority Data

May 12, 2022 (KR) ........................ 10-2022-0058509
Jan. 27, 2023 (KR) ........................ 10-2023-0011050

(51) Int. Cl.
*G02B 6/42* (2006.01)

(52) U.S. Cl.
CPC ......... *G02B 6/4228* (2013.01); *G02B 6/4246* (2013.01); *G02B 6/4274* (2013.01)

(58) Field of Classification Search
CPC .. G02B 6/4228; G02B 6/4246; G02B 6/4274; G02B 6/4204; G02B 6/4214; G02B 6/4238; G02B 6/4249; G02B 6/4292
See application file for complete search history.

(56) References Cited

U.S. PATENT DOCUMENTS 10,976,507 B2 * 4/2021 Kim ........................ G02B 6/34

* cited by examiner

*Primary Examiner* — John Bedtelyon

(57) ABSTRACT

Disclosed is an optical module that improves optical coupling efficiency. Embodiments of the present invention provide an optical module including a first photonic device comprising a first emitting surface emitting an optical signal having a predetermined wavelength and intensity; a second photonic device comprising a first incident surface where the optical signal having the predetermined wavelength is incident; and a first intermediate layer comprising a first receiving surface receiving an optical signal delivered from the first photonic device and a first transmitting surface transmitting an optical signal to the outside and formed with a material having at least one of predetermined physical, mechanical, thermal, and optical properties between the first emitting surface and the first incident surface for transmission of an optical signal passing through the first receiving surface and the first transmitting surface.

13 Claims, 7 Drawing Sheets

(a)

(b)

(a)

(b)

(a)

(b)

(a)

(b)

(a)

(b)

(a)

(b)

(a)

(b)

OPTICAL MODULE

CROSS REFERENCE TO RELATED APPLICATION

The present application claims the benefit of priority to Korean Patent Applications No. 10-2022-0058509, filed May 12, 2022 and No. 10-2023-0011050, filed Jan. 27, 2023, the entire contents of which is incorporated herein for all purposes by this reference.

BACKGROUND OF THE INVENTION

Field of the Invention

Embodiments of the present invention relate to an optical module with improved optical coupling efficiency.

Description of the Related Art

The content described in this section is merely intended to provide background information about the present disclosure and does not constitute any conventional technology.

Global Internet traffic can be classified into three categories by its destination: intra-data center traffic, inter-data center traffic, and data center-end user traffic. Of the three types of data traffic, intra-data center traffic has the largest proportion. The vast majority of data generated worldwide is a result of production, processing, storage, and verification within data centers, and with the widespread use of artificial intelligence (AI), machine learning (ML), and big data applications, the amount of data traffic generated within data centers is increasing rapidly.

One way to efficiently manage the rapidly increasing intra-data center traffic is to expand the use of data center optical interconnect solutions, i.e., the expansion of optical modules such as optical transceivers and active optical cables within data centers. The total addressable market of optical modules is gradually expanding with the development of optical communication technology and the increase in data traffic. The common goal of the various standards adopted in optical interconnect solutions is to achieve high-speed, high-bandwidth, and high-density data transmission.

The technical difficulty and burdens of the technologies adopted in optical modules are increasing with rising demand for high-speed, high-bandwidth, and high-density data transmission, and optical modules of the total hardware cost in a data center become greater, making it more urgent than ever to secure and innovate the mass production technology of optical modules.

The most critical factors that affect the yield and productivity in mass-producing optical modules are the precision of the optical alignment, the optical coupling efficiency, and the optical signal integrity of optical modules.

Typically, in advanced data center optical modules consisting of four or more channels, the internal optical alignment is achieved using an active optical alignment method that utilizes expensive high-precision equipment and measurement instruments.

FIG. 1 illustrates an example of an optical signal transmission structure applied to a multi-channel optical module using a conventional lens optical system.

The transmitter located on the left side of FIG. 1 includes a substrate S and a transmitter lens assembly 110 formed on the substrate S. The receiver located on the right side of FIG. 1 includes a substrate S' and a receiver lens assembly 120 formed on the substrate S'. The transmitter and receiver are connected via an optical waveguide 600, such as a multi-channel fiber optic cable, and the optical signal transmitted from the transmitter is transmitted in order through the transmitter lens assembly 110, the optical waveguide 600, and the receiver lens assembly 120 to be received by the receiver.

FIGS. 2 and 3 respectively illustrate the transmitter lens assembly and receiver lens assembly of the optical signal transmission structure shown in FIG. 1.

The transmitter lens assembly 110 is formed by including the first transmitter lens unit 111, the second transmitter lens unit 112, and the transmitter reflection unit 113. Typically, the first transmitter lens unit 111, the second transmitter lens unit 112, and the transmitter reflection unit 113 are formed through injection molding using a single mold, but it is also possible to use two or more molds to create more complicated structures.

The receiver lens assembly 120 is formed by including a first receiver lens unit 125, a second receiver lens unit 124, and a receiver reflection unit 123. The receiver lens assembly 120 is also formed through injection molding using at least one mold, similar to the transmitter lens assembly 110.

To achieve a precise micrometer-level alignment of optical signals required for data center optical modules, sophisticated injection molding technology is essential, and as data rates and channel counts continue to increase, the need for even more advanced injection molding technology becomes increasingly apparent.

In an uninterrupted optical signal transmission link from an optical transmitter to an optical receiver, it is essential to suppress various types of optical signal noise that may occur in the transmitter and/or receiver to improve the optical signal integrity.

FIGS. 4 and 5 are diagrams illustrating the transmission and reception paths of optical signals passing through the transmitter lens assembly and receiver lens assembly shown in FIGS. 2 and 3, respectively.

Referring to FIG. 4, the optical signals (λ1, λ2, λ3, and λ4) transmitted from the light emitting device 100 are passing through the first transmitter lens unit 111, reflected at the transmitter reflection unit 113, passing through the second transmitter lens unit 112, and entering the optical waveguide 600.

Entering the optical waveguide 600, the optical signals (λ1, λ2, λ3, and λ4) transmitted from the light emitting device 100 encounter four different interfaces, each of which can cause optical reflection noise or optical scattering noise, leading to a degradation of the optical signal integrity. The four different interfaces encountered by the optical signals passing through the transmitter lens assembly include the interface 1A between the air and the first transmitter lens unit 111, the reflecting surface 1B in the transmitter reflection unit 113, the interface 1C between the second transmitter lens unit 112 and the air, and the interface 1D between the air and the surface of the optical waveguide 600.

Here, the light emitting device 100 transmits four different optical signals (λ1, λ2, λ3, and λ4), and each of the four optical signals (λ1, λ2, λ3, and λ4) is transmitted through a different optical path and delivered to the optical waveguide 600.

Referring to FIG. 5, the optical signals (λ1, λ2, λ3, and λ4) exiting the optical waveguide 600 are passing through the first receiver lens unit 125, reflected at the receiver reflection unit 123, passing through the second receiver lens unit 124, and entering the light receiving device 300.

The optical signals (λ1, λ2, λ3, and λ4) exiting the optical waveguide 600 and entering the light receiving device 300 encounter four different interfaces, each of which can cause optical reflection noise or optical scattering noise, leading to a degradation of the optical signal integrity.

Similarly to the transmitter, there are several parts in the receiver that can significantly degrade the optical signal integrity by causing optical reflection noise and optical scattering noise, and such parts include the interface 1E where the air meets one surface of the optical waveguide 600, the interface 1F where the air meets the first receiver lens unit 125, the reflective surface 1G within the first receiver reflection unit 123, the interface 1H where the second receiver lens unit 124 meets the air, and the surface of the light receiving device 300.

In addition to an optical signal reflection noise and an optical signal scattering noise, an optical crosstalk noise emerging as a significant issue in data center optical modules will be explained with reference to FIGS. 4 to 6.

FIG. 6 is a diagram for explaining the optical signal transmission structure shown in FIG. 1 and the corresponding optical signal transmission characteristics thereof.

In a multi-channel optical module, there exists an optical signal crosstalk noise in addition to the optical signal reflection noise and the optical signal scattering noise as mentioned above. This problem is exacerbated with the adoption of the pulse amplitude modulation level-4 (PAM4) modulation technique in the Institute of Electrical and Electronics Engineers (IEEE) 802.3 Ethernet standard signal transmission system.

Part (a) of FIG. 6 illustrates a desirable optical transmission structure that can be achieved in a multi-channel optical module implemented with four channels, i.e., a case where there is no optical signal noise, resulting in good optical signal integrity. On the other hand, part (b) of FIG. 6 represents a poor optical transmission structure that can occur in a multi-channel optical module implemented with four channels, i.e., a case where there is an optical signal crosstalk noise, resulting in poor optical signal integrity.

In the optical transmission structure shown in part (a) of FIG. 6, the optical signal (λ1) transmitted from the first light emitting device VCSEL1 included in the light emitting device 100' is transmitted through the first transmitter lens unit 111' and the second receiver lens unit 124' and delivered to the first light receiving device PD1 included in the light receiving device 300'. The optical signal (λ2) transmitted from the second light emitting device VCSEL2 included in the light emitting device 100' is transmitted through the first transmitter lens unit 111' and the second receiver lens unit 124' and delivered to the second light receiving device PD2 included in the light receiving device 300'. The optical signals (λ3) transmitted from the third light emitting device VCSEL3 and (λ4) transmitted from the fourth light emitting device VCSEL4 are also well delivered without crosstalk to the third light receiving device PD3 and fourth light receiving device PD4 included in the light receiving device 300', respectively.

On the other hand, referring to the optical transmission structure shown in (b) of FIG. 6, the optical signal (λ1) transmitted from the first light emitting device VCSEL1 included in the light emitting device 100' is transmitted through the first transmitter lens unit 111' and the second receiver lens unit 124' and delivered to the second light receiving device PD2 included in the light receiving device 300', while the optical signal (λ3) transmitted from the third light emitting device VCSEL3 is scattered while passing through the first transmitter lens unit 111', reflected at the second receiver lens unit 124', and scattered again while passing through the first transmitter lens unit 111' so as to be incident on the first light emitting device VCSEL1. Frequent occurrences of such phenomena in optical modules can lead to significant errors in optical signal transmission, rendering the module unable to operate properly and thus reducing the overall efficiency of the data center system. Here, the optical signal noise generated as shown in (b) of FIG. 6 is referred to as optical signal crosstalk noise, which is one of the typical types of optical signal noise that is always present in multi-channel optical modules.

The productivity and yield of the optical module can be significantly increased if the optical alignment accuracy, optical coupling efficiency, and optical signal integrity can be improved. For this reason, many optical module manufacturers adopt active optical alignment methods to increase the accuracy of optical alignment, which requires expensive high-precision equipment and measurement instruments.

To meet high-speed, high-bandwidth, and high-density requirements, both the aggregate bandwidth and individual per channel data rate of optical module increase, causing the photonic and electronic devices included in the optical module to be capable of high-speed/bandwidth operation, while the optical alignment/coupling configuration connecting the photonic devices and the optical waveguides must be more precise and accurate.

To achieve high-speed operation of photonic devices used for transmitting and receiving optical signals, a wide operating frequency range is required, which necessitates minimizing parasitic resistance, parasitic capacitance, and parasitic inductance. The most essential and straightforward method to reduce these parasitic components is to reduce the size of the aperture that transmits or receives the optical signal.

Reducing the size of the aperture facilitates the high-speed operation of photonic devices, but simultaneously makes it difficult to achieve precise optical alignment and high-efficient optical coupling. For example, the diameter of the aperture of a commercially available photodiode capable of operating at 56 Gbps per channel PAM4 is around 40 μm, whereas the diameter of the aperture of an optical diode capable of operating at 112 Gbps per channel PAM4 is around 25 μm. Although the diameter is different by a factor of 1.6, there is a 2.56-fold difference in the area where the optical signal needs to be incident. Aligning the optical signal precisely and accurately to be incident on the much smaller area that is 2.56 times smaller is even more challenging, and considering the international standards or restrictions required for optical modules, as well as the yield and productivity described earlier, it is currently very difficult to achieve mass production using commercially available technologies.

To achieve high productivity and yield, individual components forming optical modules, including photonic devices, lenses, reflectors and optical waveguides (optical fibers) need to be prepared using expensive and precise manufacturing processes and these individual components must be precisely and accurately aligned by expensive automated equipment.

In addition, the optical system used in conventional optical modules includes as many lenses as the number of channels in one lens assembly, which inevitably leads to an optical signal crosstalk noise between channels that adopt this system, resulting in a serious problem in next-generation optical modules with complex signal systems.

Therefore, there is a need for high-speed, high-bandwidth and high-density optical modules without compromising high optical signal integrity on a complete passive alignment manner, which can ensure high productivity and yield without requiring expensive precision equipment or measurement instruments, and at the same time.

SUMMARY OF THE INVENTION

It is an object of the embodiments of this invention to provide high-speed, high-bandwidth, and high-density optical modules while ensuring high optical signal integrity.

It is another object of the embodiments of this invention to provide optical modules that allows for mass production using a complete passive alignment method that can achieve high productivity and yield without using expensive precision equipment or measurement instruments.

The objects of the embodiments are not limited to those stated above, but also include objects or effects that can be deduced from the means for solving the problems or from the embodiments described below.

According to an aspect of the embodiments of the present invention, an optical module includes a first photonic device including a first emitting surface emitting an optical signal having a predetermined wavelength and intensity, a second photonic device comprising a first incident surface where an optical signal having a predetermined wavelength and intensity is incident, a first intermediate layer comprising a first receiving surface receiving an optical signal delivered from the first photonic device and a first transmitting surface transmitting an optical signal to the outside and formed with a material having at least one of predetermined physical, mechanical, thermal, and optical properties between the first emitting surface and the first incident surface for transmission of the optical signal passing through the first receiving surface and the first transmitting surface, an optical coupling wire comprising a first end formed with a predetermined first shape and first material in contact with the first transmitting surface, a second end formed with a predetermined second shape and second material in contact with the second photonic device, and an intermediate wire unit formed to connect the first end and the second end without interruption for transmitting the optical signal received through the first end to the second end, and a second intermediate layer comprising a second receiving surface receiving the optical signal emitted from the optical coupling wire and a second transmitting surface transmitting the optical signal to the outside and formed with a material having at least one of predetermined physical, mechanical, thermal, or optical properties between the second transmitting surface and the first incident surface for transmission of the optical signal passing through the second receiving surface and the first incident surface.

BRIEF DESCRIPTION OF THE DRAWINGS

FIG. 5 is a diagram illustrating an optical signal reception path using the receiver lens assembly shown in FIG. 3;

DETAILED DESCRIPTION OF THE INVENTION

Hereinafter, some embodiments of the optical module according to the present invention will be described in detail with reference to exemplary diagrams. For reference, since terms referring to each component of the present invention are exemplarily named in consideration of its functions, the technical contents of the present invention should not be predicted and limited by the terms themselves.

Furthermore, since the various embodiments of the present invention to be described below are only intended to exemplarily show the technical spirit of the present invention, the protection scope of the present invention should be construed according to the appended claims. In addition, since those skilled in the art to which the present invention belongs will be able to design various modifications and variations without departing from the essential characteristics of the present invention, the scope of the present should be interpreted as covering all technical ideas within the scope equivalent to the present invention.

Figure 7:
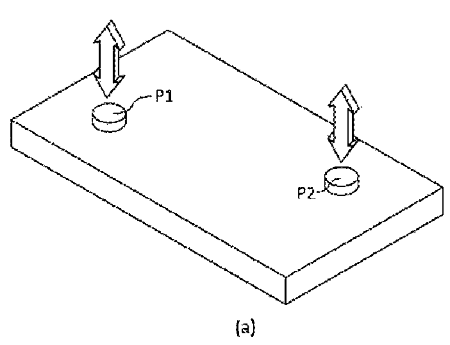
FIG. 7 is a conceptual diagram illustrating an optical module including two photonic devices formed on the same substrate and an optical coupling wire connecting the two photonic devices according to an embodiment of the present invention.
Figure 7:
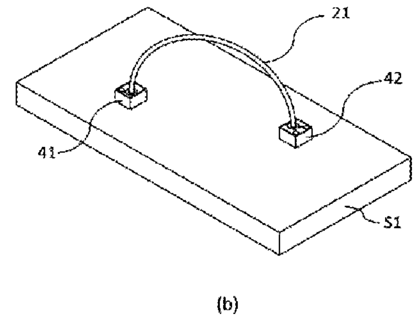

FIG. 7 is a conceptual diagram illustrating an optical module including two photonic devices formed on the same substrate and an optical coupling wire connecting the two photonic devices according to an embodiment of the present invention.

As shown in part (a) of FIG. 7, two optical ports P1 and P2 formed on the same plane provide a path for the passage of optical signals. The two optical ports P1 and P2 may both serve to transmit or receive optical signals, or one may serve to transmit while the other serves to receive.

Similar to part (a) of FIG. 7, the two photonic devices formed on a certain substrate may optically couple with each other through an optical coupling wire, as shown in (b) of FIG. 7, to transmit and receive optical signals.

With reference to (b) of FIG. 7, an optical module according to an embodiment of the present invention includes a first substrate S1, a first photonic device 41, a second photonic device 42, and a first optical coupler 21.

The substrate S1 may be formed of a flat and rigid material to support the first photonic device 41 and the second photonic device 42. The first substrate S1 may be made of glass or synthetic resin with high light transmittance, which is advantageous for transmitting and receiving optical signals, or a printed circuit board (PCB) that includes at least one layer for transmitting and receiving electrical signals. It may also be a photonic integrated circuit using semiconductors that can reflect or absorb optical signals at specific wavelengths.

The first and second photonic devices 41 and 42 refer to devices that can emit light, receive light, or convert the waveform of optical signals. The light emitting device refers to an electro-optical conversion device, and the light receiving device refers to a photoelectric conversion device. Here, the electro-optical conversion device refers to a device that converts electrical signals into optical signals, such as light-emitting diode (LED), distributed feedback laser diode (DFB-LD), and vertical-cavity surface emitting laser (VCSEL). Meanwhile, the photoelectric conversion device refers to a device that converts optical signals into electrical signals, such as p-i-n type photodiode (PIN-PD) and an avalanche photodiode (APD). As devices capable of transmitting and receiving optical signals, both the first photonic device 41 and the second photonic device 42 include optical ports, provided in the form of one of the two optical ports shown in part (a) of FIG. 7.

When the first photonic device 41 provides one optical port P1 as a light-emitting device, the second photonic device 42 may provide the other optical port P2 as a light receiving device, and the surface (one of the incident surface and exit surface) of the first photonic device 41 and the surface (one of incident surface or exit surface) of the second photonic device 42 are connected by the first optical coupling wire 21. In this case, the connection of such optical signals is called optical coupling, and when the first photonic device 41 and the second photonic device 42 are smoothly connected by the first optical coupling wire 21, the system may be expressed as having good optical coupling efficiency.

The first optical coupling wire 21 can be formed using a synthetic resin with a high light transmittance and a refractive index similar to that of the optical fiber. The first optical coupling wire 21 is designed and formed, in consideration of the physical, mechanical, thermal, or optical alignment with the two different interfaces that come into contact with the first optical coupling wire 21, to provide high optical coupling efficiency with the photonic device coupled thereto optically. Here, physical, mechanical, or thermal alignment may include the thermal expansion coefficient, adhesion, or roughness of the two different materials that form the two interfaces, while optical alignment may include reflection, refraction, or absorption occurring between the two different materials that form the two interfaces. Here, the two different interfaces that come into contact with the first optical coupling wire 21 can be the surface of the first photonic device 41 or the surface of the second photonic device 42.

The first optical coupling wire 21 may be formed of a homogeneous material as a compound prepared by mixing various materials, or may be formed to have a discontinuous property of discontinuously or gradually changing according to predetermined process conditions. For example, when the materials forming the first photonic device 41 in contact with one end of the first optical coupling wire 21 and the second photonic device 42 in contact with the other end of the first optical coupling wire 21 have different physical, mechanical, thermal, or optical properties, the material forming the portion of the first optical coupling wire 21 in contact with the first photonic device 41 is designed and formed to be compatible with the physical, mechanical, thermal, or optical properties of the first photonic device 41, while the material forming the portion of the first optical coupling wire 21 in contact with the second photonic device 42 is designed and formed to be compatible with the physical, mechanical, thermal, or optical properties of the second photonic device 42. The first optical coupling wire 21 may be formed by adjusting the amount of material in the middle portion to have physical, mechanical, thermal, or optical properties that correspond to an intermediate degree of the properties exhibited at both ends.

The first optical coupling wire 21 is designed and formed to serve as an optical waveguide core itself, with the surrounding air used as the cladding for the optical waveguide. In this case, the optical signal incident into the first optical coupling wire 21, for example, the optical signal emitted from the first photonic device 41 and incident into one end of the first optical coupling wire 21, is transmitted through the other end of the first optical coupling wire 21 without leaking out to the outside during the passage through the first optical coupling wire 21 so as to be delivered to the second photonic device 42 in contact with the first optical coupling wire 21.

The first optical coupling wire 21 may be used as an optical waveguide, similar to conventional optical fibers, by adding a material with different optical properties than the first optical coupling wire 21 to the outside of the first optical coupling wire 21. The inclusion of such additional material is useful when the first optical coupling wire 21 cannot utilize air as its cladding for the optical waveguide.

Figure 8:
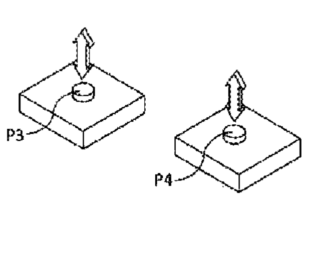
FIG. 8 is a diagram illustrating an optical module including two optical couplers formed on the same substrate and an optical coupling wire connecting the two optical couplers according to an embodiment of the present invention.
Figure 8:
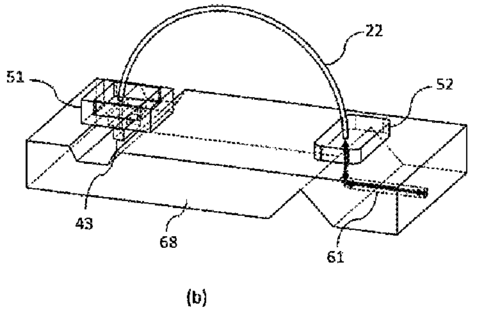

FIG. 8 is a diagram illustrating an optical module including two optical couplers formed on the same substrate and an optical coupling wire connecting the two optical couplers according to an embodiment of the present invention.

As shown in part (a) of FIG. 8, two optical ports P3 and P4 formed on two different parallel planes provide paths for optical signals to pass through. The two optical ports P3 and P4 may both serve to transmit or receive optical signals, or one may serve to transmit while the other serves to receive. An embodiment in which these two optical ports P3 and P4 are actually implemented is shown in part (b) of FIG. 8.

With reference to part (b) of FIG. 8, the optical module according to an embodiment of the present invention includes an optical interposer 68, a third photonic device 43, a first optical coupler 51, a second optical coupler 52, a first optical waveguide 61, and a second optical coupling wire 22.

The optical interposer 68 refers to a platform formed to include a plurality of electronic devices and a plurality of photonic devices to facilitate the transmission of electrical and optical signals. Here, the electronic devices include various signal processing circuit device such as signal generators, amplifiers, modulators, demodulators, frequency converters, linearizers, voltage converters, etc., that can be manufactured using compound or silicon fabrication technology. The photonic devices include semiconductor laser diodes, photodiodes, optical modulators, optical demodulators, optical multiplexers, optical demultiplexers, filters, reflectors, lenses, optical waveguides, and optical couplers.

The third photonic device 43 may include a light emitting device such as VCSEL, DFL-LD, or LED and generate an optical signal having a predetermined characteristic by receiving an electric signal from the outside.

The first optical coupler 51 is a structure designed in consideration of at least one of the geometric or wave dynamic characteristics of the optical signal received from the third photonic device 43 in order to transmit the received optical signal through the second optical coupling wire 22.

The geometric characteristics of the optical signal include characteristics expressed in 2-dimensional (2D) or 3D considering straightness, reflection, refraction, and the like. For example, when the optical signal received from the third photonic device 43 spreads out with a specific radiation angle, the spreading optical signal may be changed into a form converging or traveling parallel to be transmitted through the second optical coupling wire 22.

In addition, the first optical coupler 51 may be designed in consideration of the wave dynamic characteristics of the optical signal. For example, the first optical coupler 51 may be a grating coupler designed to transmit the optical signal received from the third photonic device 43 through the second optical coupling wire 22. To achieve this, the first optical coupler 51 is designed in consideration of the characteristics of the optical signal transmitted through it, such as mode and polarization.

The second optical coupler 52 is a structure designed to transmit the optical signal passing through the second optical coupling wire 22 to the predetermined photonic device or outside, taking into account at least one or both of the geometric and wave dynamic characteristics of the optical signal passing through the second optical coupling wire 22.

The first optical waveguide 61 is formed with a core and cladding to enable the received optical signal from the second optical coupler 52 to be transmitted to the outside without noise or loss. Here, the core and cladding of the first optical waveguide 61 are designed in consideration of the wavelength of the optical signal generated, emitted, or transmitted from the third photonic device 43 in such a way as the refractive index distribution of the core and cladding vary continuously or are distinctly separated.

The first optical waveguide 61 may be formed of the same material as the second optical coupling wire 22, and the end portion of the first optical waveguide 61 in close contact with the second optical coupler 52 is designed in consideration of the characteristics of the optical signal transmitted from the second optical coupler 52.

Figure 9:
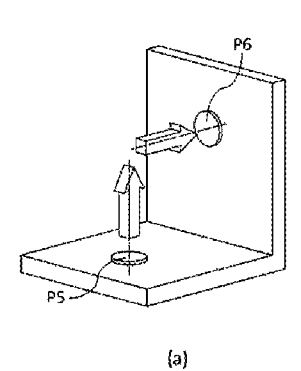
FIG. 9 is a diagram illustrating an optical module including a photonic device formed to have an optical signal incident and exit directions, which are different from each other, and an optical coupling wire connecting the photonic device and an optical waveguide according to an embodiment of the present invention.
Figure 9:
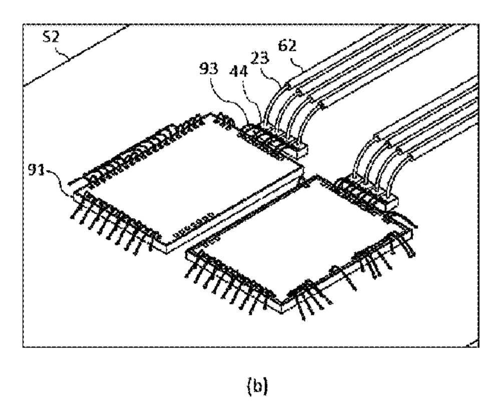

FIG. 9 is a diagram for explaining an optical module including a photonic device formed to have incident and exit directions of optical signals in different directions and an optical coupling wire connecting the photonic device and an optical waveguide according to an embodiment of the present invention.

With reference to parts (a) and (b) of FIG. 9, two optical ports P5 and P6 formed on different planes provide paths for the optical signal to pass through. The two optical ports P5 and P6 may both serve to transmit or receive optical signals, or one may serve to transmit while the other serves to receive. An embodiment in which these two optical ports P5 and P6 are actually implemented is shown in (b) of FIG. 9.

As shown in (a) of FIG. 9, an optical module with two optical ports P5 and P6 according to an embodiment of the present invention includes a second substrate S2, a fourth photonic device 44, a first electronic device 91, a second optical waveguide 62, a third optical coupling wire 23, and a first electrical wiring 93.

The second substrate S2 is made of the same material as the first substrate S1 and performs the same function. To support various photonic and electronic devices, it is made of a flat and solid material and exchanges various electrical signals to perform complex functions. Here, the electrical signals include power signals for power supply, communication signals for communication with external communication devices, and high-speed electrical signals for high-speed data transfer. To this end, it is preferable that the second substrate S2 is a printed circuit board consisting of a plurality of layers.

The fourth photonic device 44 is a device that performs the same function as the first photonic device 41, the second photonic device 42, and the third photonic device 43, and includes at least one photonic device. It is desirable for the fourth photonic device 44, when transmitting optical signals through the second optical waveguide 62, to be a high-speed electro-optical conversion device capable of generating optical signals in the opposite direction of the second substrate S2 and, when receiving optical signals from the second optical waveguide 62, to a high-speed photoelectric conversion device capable of receiving optical signals directed towards the second substrate S2.

The first electronic device 91 is an electronic device that helps drive the fourth photonic device 44 and includes at least one semiconductor-integrated circuit manufactured through a semiconductor process. The first electronic device 91 is electrically connected to the fourth photonic device 44 to supply power to the fourth photonic device 44. In addition, the first electronic device 91 is electrically connected to the fourth photonic device 44 to apply a driving signal to the fourth photonic device 44 such that the fourth photonic device 44 can generate a high-speed optical signal.

The second optical waveguide 62 includes at least one optical waveguide and is formed to include a core and cladding to transmit received optical signals to the outside without noise and loss. The second optical waveguide 62 may perform the same function as the first optical waveguide 61.

The third optical coupling wire 23 is formed to be in close contact with the surface of the fourth photonic device 44 and the surface of the second optical waveguide 62 to ensure smooth transmission and reception of optical signals between the fourth photonic device 44 and the second optical waveguide 62. The third optical coupling wire 23 may perform the same function and be made of the same material as the first optical coupling wire 21 and the second optical coupling wire 22. When the fourth photonic device 44 and the second optical waveguide 62 are plural, the third optical coupling wire 23 also includes a necessary number of optical coupling wires for connection therebetween.

The first electrical wiring 93 is formed to include at least one electrical wiring and is used to supply power from the first electronic device 91 to the fourth photonic device 44 or to apply a high-speed driving signal. In addition, the first electrical wiring 93 serves as a medium for transmitting high-speed electrical signals that are optoelectrically converted in the fourth photonic device 44 to the first electronic device 91.

An optical module with improved optical coupling efficiency according to an embodiment of the present invention may include at least one of the fourth photonic device 44, the first electronic device 91, the second optical waveguide 62, third optical coupling wire 23, and first electrical wiring 93 arranged in a space predetermined on the second substrate S2 and may be manufactured by including an additional photonic and electronic device to drive or assist driving the fourth photonic device 44 and first electronic device 91.

In addition, an optical module with improved optical coupling efficiency according to an embodiment of the present invention may include at least one of a power unit, a modulation unit, an amplification unit, and a control unit as an additional component.

The power supply unit (not shown) supplies power to at least one of the fourth photonic device 44 or the first electronic device 91.

The modulation unit (not shown) receives power from the power supply unit to directly apply an electrical signal to the fourth photonic device 44 or to adjust the optical absorption coefficient of the optical path through which the optical signal emitted from the fourth photonic device 44 passes, in order to change the waveform of the optical signal emitted from the fourth photonic device 44.

The amplification unit (amplifier, not shown) receives power and changes the waveform of the electrical signal generated from the conversion in the fourth photonic device 44.

The control unit (not shown) is electrically connected to at least one of the power supply unit, the modulation unit, and the amplification unit, and controls at least one of the power supply unit, the modulation unit, and the amplification unit.

The power supply unit, modulation unit, amplification unit, and control unit may either be integrated into a single unit or separately formed as an individual device.

Figure 10:
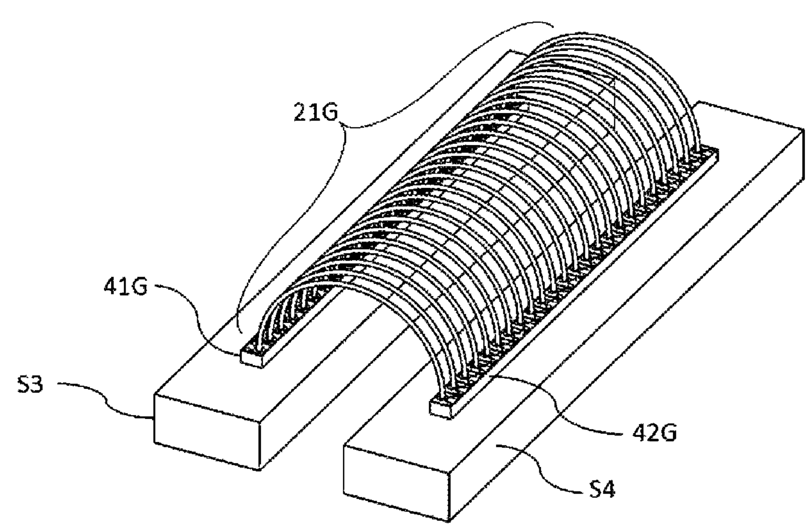
FIG. 10 is a diagram illustrating an optical module including a plurality of optical coupling wires connecting two multi-channel photonic devices formed on two different substrates according to an embodiment of the present invention.

FIG. 10 is a diagram illustrating an optical module including a plurality of optical coupling wires connecting two multi-channel photonic devices formed on two different substrates according to an embodiment of the present invention.

Figure 11:
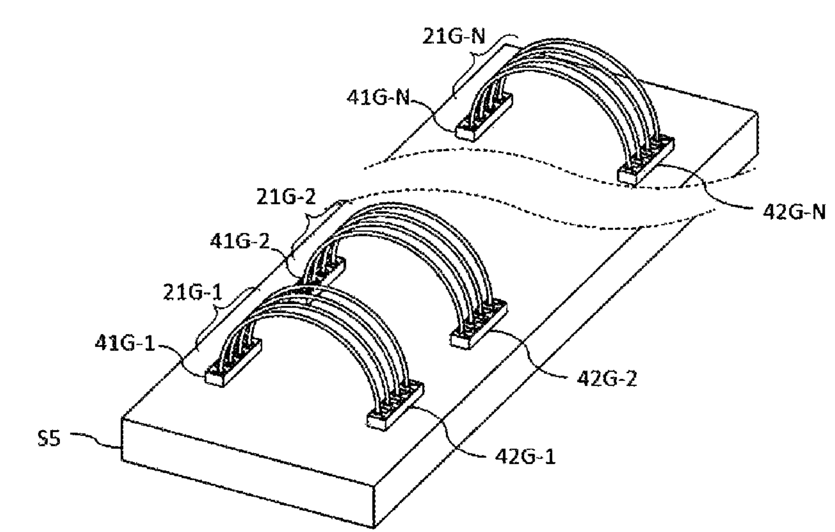
FIG. 11 is a diagram illustrating an optical module including a plurality of optical coupling wires connecting a plurality of multi-channel photonic devices formed on a single substrate according to an embodiment of the present invention.
Figure 12:
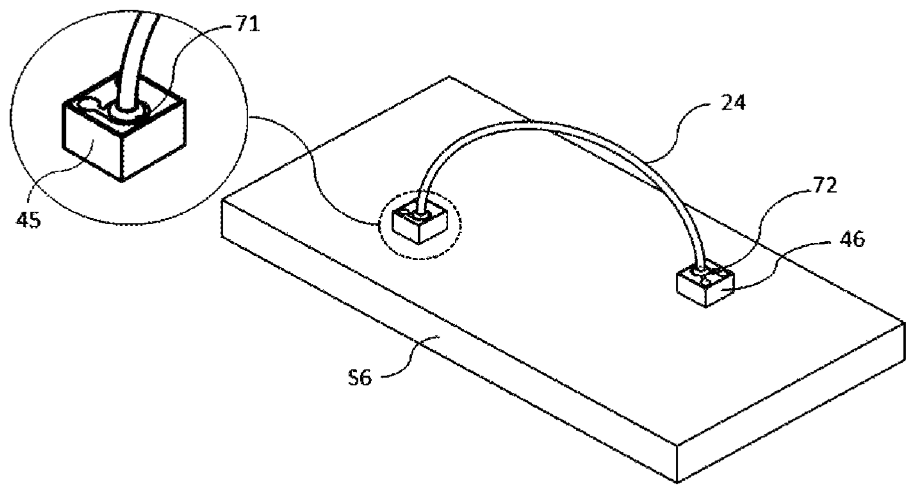
FIG. 12 is a diagram conceptually illustrating an optical module including an intermediate layer formed at the connection area between two photonic devices and an optical coupling wire formed on the same substrate according to an embodiment of the present invention.
Figure 13:
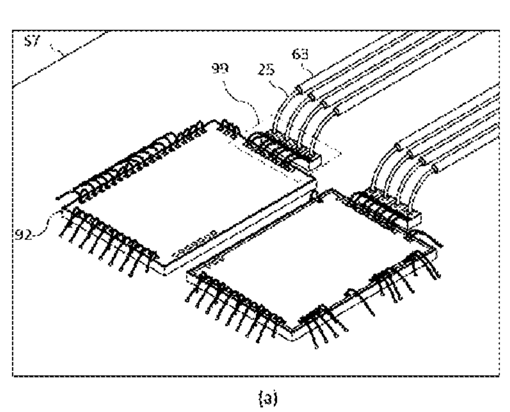
FIG. 13 is a diagram for explaining the concept of an optical module including an intermediate layer formed at the connection area of an optical coupling wire connecting between an photonic device formed to have an optical signal incident and exit directions, which are different from each other, and an optical waveguide according to an embodiment of the present invention.
Figure 13:
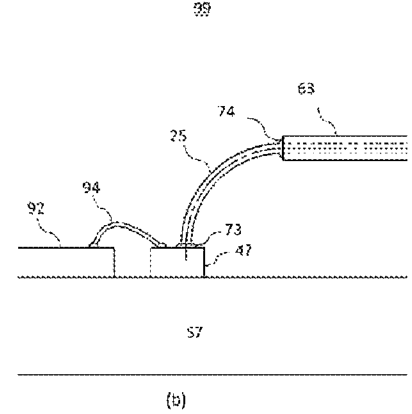

Referring to FIG. 10, an optical module with a plurality of optical coupling wires connecting two different multi-channel photonic devices formed on two separate substrates according to an embodiment of the present invention includes a third substrate S3, a fourth substrate S4, a first photonic device group 41G, a second photonic device group 42G, and a first optical coupling wire group 21G and performs some or all of the functions of the optical modules described with reference to FIGS. 7, 8, and 9 and to be described with reference to FIGS. 11, 12, and 13.

The third and fourth substrates S3 and S4 are designed to perform the same functions as the first substrate S1 or the second substrate S2 and are described in the same manner.

Each of the first photonic device group 41G and the second photonic device group 42G is formed to be arranged side by side, including selected ones or all of the first photonic device 41, the second photonic device 42, the third photonic device 43, and the fourth photonic device 44. The plurality of photonic devices included in the first photonic device group 41G may be formed as a plurality of light emitting devices or a plurality of light receiving devices preferably for the convenience of manufacturing the optical module, or may be formed as a combination of light emitting devices and light receiving devices.

When the individual device of the first photonic device group 41G are connected by each optical coupling wire of the first optical coupling wire group 21G are light emitting devices transmitting optical signals or optical couplers transmitting optical signals received from the light emitting devices through the optical coupling wire, it is preferable that the individual device included in the corresponding second photonic device group 42G are light receiving devices or optical couplers for transmitting the optical signals to another location.

Since the optical signal transmission and reception between individual photonic devices included in the first and second photonic device groups 41G and 42G are connected via individual optical coupling wires included in the first optical coupling wire group 21G, it is possible to fundamentally eliminate optical signal interference noise caused by an optical signal being transmitted and received by adjacent photonic devices.

FIG. 11 is a diagram illustrating an optical module including a plurality of optical coupling wires connecting a plurality of multi-channel photonic devices formed on a single substrate according to an embodiment of the present invention.

Figure 1:
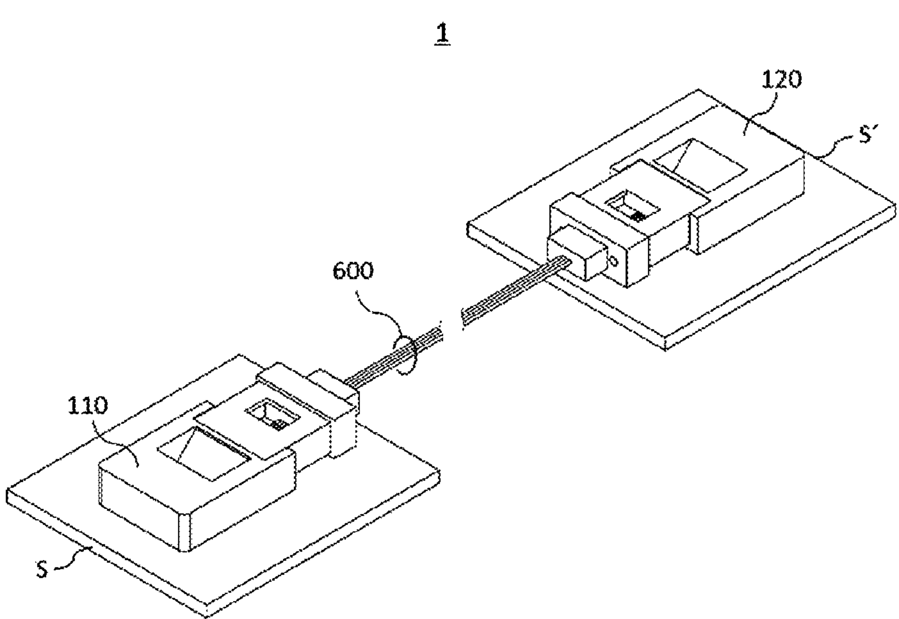
FIG. 1 illustrates an example of an optical signal transmission structure applied to a multi-channel optical module using a conventional lens optical system.
Figure 2:
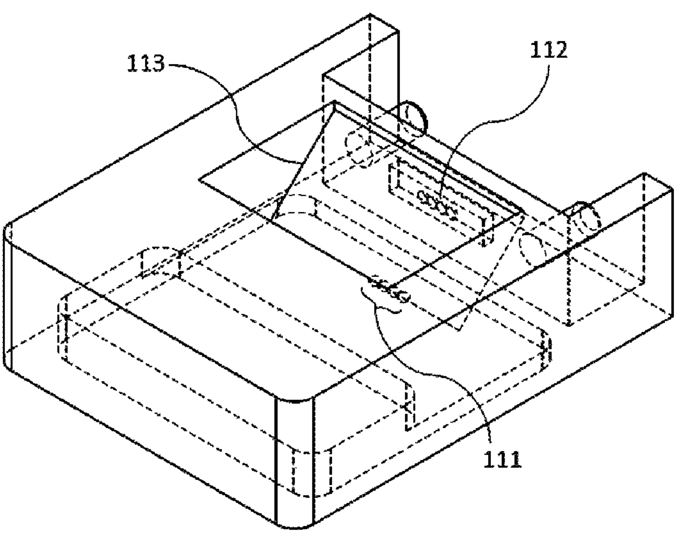
FIGS. 2 and 3 respectively illustrate the transmitter lens assembly and receiver lens assembly of the optical signal transmission structure shown in FIG. 1.
Figure 3:
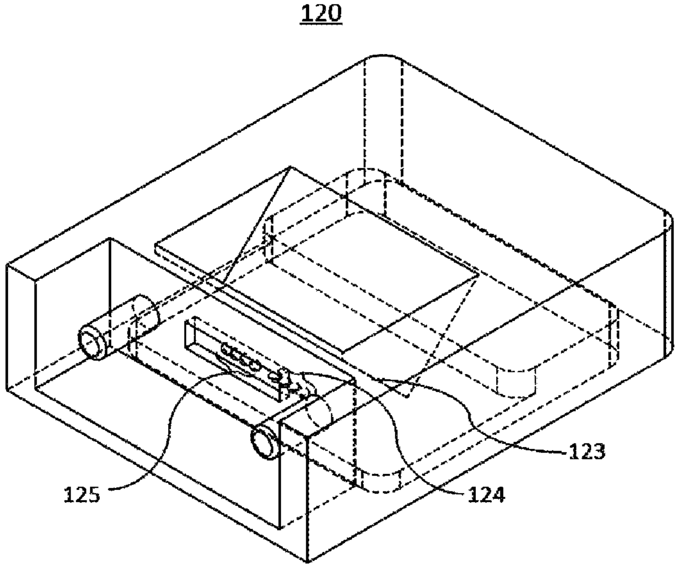
Figure 4:
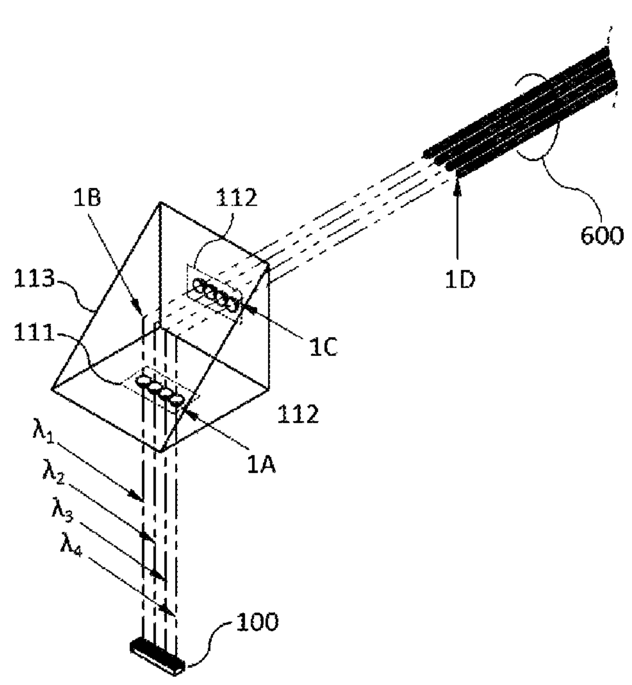
FIGS. 4 and 5 are diagrams illustrating the transmission and reception paths of optical signals passing through the transmitter lens assembly and receiver lens assembly shown in FIGS. 2 and 3, respectively.
Figure 5:
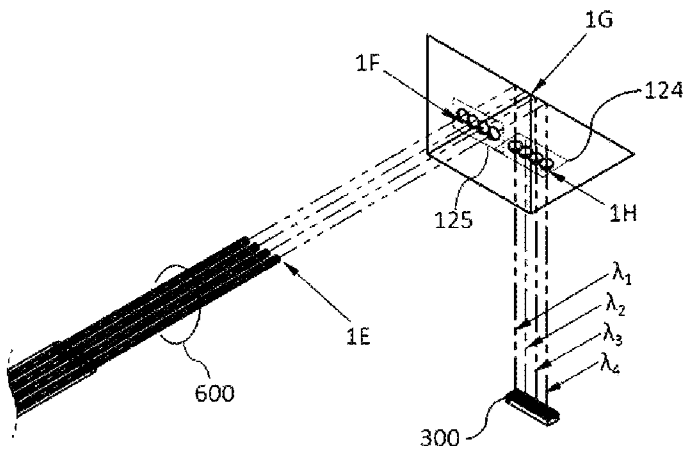
Figure 6:
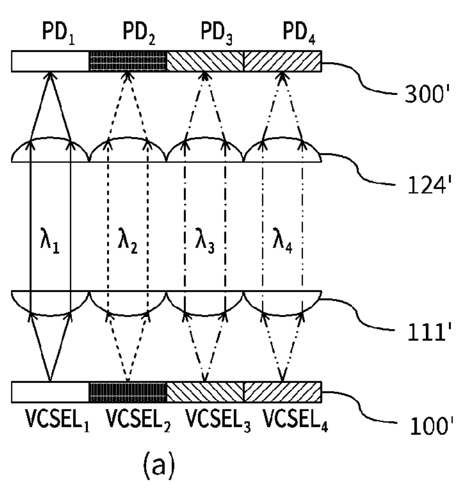
FIG. 6 is a diagram for explaining the optical signal transmission structure shown in FIG. 1 and the corresponding optical signal transmission characteristics thereof.
Figure 6:
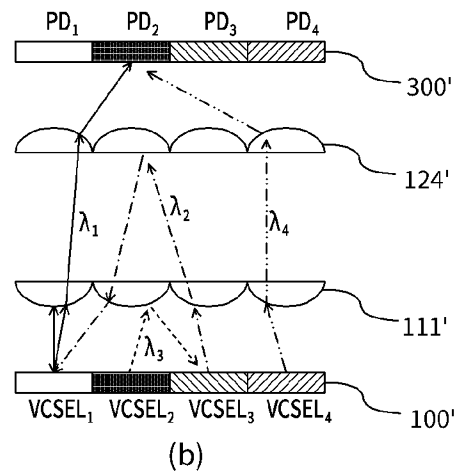

Referring to FIG. 11, an optical module with a plurality of optical coupling wires connecting a plurality of multi-channel photonic devices formed on a substrate according to an embodiment of the present invention includes a fifth substrate S5, a plurality (N) of first photonic device group 41G-1, . . . , 41G-N (N is a natural number), a plurality (N) of second photonic device groups 42G-1, . . . , 42G-N(N is a natural number), and a plurality (N) of optical coupling wires 21G-1, . . . , 21G-N(N is a natural number) and performs some or all of the functions of the optical modules described with reference to FIGS. 3, 4, and 5 and to be described with reference to FIGS. 11, 12, and 13.

The fifth substrate S5 is designed to be formed in the same manner and to perform the same functions as the first substrate S1 or the second substrate S2.

Each of the first photonic device group 41G-N and the second photonic device group 42G-N is formed to be arranged side by side, including selected ones or all of the first photonic device 41, the second photonic device 42, the third photonic device 43, and the fourth photonic device 44. In addition, each of the plurality of first photonic device groups 41G-N or the plurality of second photonic device groups 42G-N may be partially positioned in a predetermined space to have subgroups. Although it is preferable for each of the multiple first photonic device groups 41G-N or second photonic device groups 42G-N to be formed as subgroups of light-emitting devices or light-receiving devices to facilitate optical module fabrication, they may also be possible to be formed as a combination of light-emitting devices and light-receiving devices.

When the individual device of the plurality of first photonic device group 41G-N connected by each of the optical coupling wires included in the subgroups of the plurality of first optical coupling wire group 21G-N are light emitting devices transmitting optical signals or optical couplers transmitting optical signals received from the light emitting devices through the optical coupling wire, it is preferable that the individual photonic devices included in the plurality of corresponding second photonic device group 42G-N are light receiving devices or optical couplers for transmitting the optical signals to another location.

As the number of photonic devices or the number of optical waveguides formed on a single substrate increases, it may become more difficult to manufacture and have a significant impact on product yield and productivity. For example, assuming a yield of 90% for a single optical link formed by the coupling of one photonic device and one optical waveguide, the yield for an optical link portion consists of four photonic devices and four optical waveguides coupled together is 65%. In optical modules commonly used in data centers, such as Quad Small Form-Factor Pluggable (QSFP), QSFP Double Density (QSFP-DD), or Octal Small Form-Factor Pluggable (OSFP) modules, the number of optical link portions included is 8 or 16, which means that the yield for each of these products may drop to as low as 43% and 19%, respectively. Considering that this is the yield without taking into account the opposite transmitting and receiving ends, when the yield on the opposite transmitting and receiving ends is equally calculated, the product yield for configuration of an optical signal link consisting of two optical modules will decrease by up to 19% and 4%, respectively.

Here, the most significant factors that affect the yield from the point of generating optical signals to the point of receiving the optical signals are optical alignment accuracy, optical coupling efficiency, and optical signal noise. Improving the optical alignment accuracy and optical coupling efficiency while reducing optical signal noise may significantly increase the yield and productivity of optical modules in mass production.

An optical module with improved optical coupling efficiency according to an embodiment of the present invention is capable of establishing a plurality of optical connections from the point of generating optical signals to the point of receiving the optical signals via individual optical coupling wires, in cases where a plurality of photonic devices are connected to a plurality of optical waveguides or where a plurality of photonic devices are connected to a plurality of photonic devices. By forming a closed optical coupling wire between two points precisely using this method, the optical module with improved optical coupling efficiency according to an embodiment of the present invention is capable of allowing the optical signal to travel back and forth between the desired two points and achieving high optical alignment accuracy, high optical coupling efficiency, and high optical signal noise performance via individual optical coupling wires even in cases where multiple photonic devices are present.

FIG. 12 is a diagram conceptually illustrating an optical module including an intermediate layer formed at the connection area between two photonic devices and an optical coupling wire formed on the same substrate according to an embodiment of the present invention;

As shown in FIG. 12, the optical module including two photonic devices formed on the same substrate and an intermediate layer additionally formed at a connection part of the optical coupling wire according to an embodiment of the present invention includes a sixth substrate S6, a fifth photonic device 45, a sixth photonic device 46, a fourth optical coupling wire 24, a first intermediary layer 71, and a second intermediary layer 72, and performs some or all of the functions of the optical modules described with reference to FIGS. 7, 8, 9, 10, 11, and 12.

The sixth substrate S6 is designed to be formed in the same manner and to perform the same function as the first substrate S1 or the second substrate S2.

Each of the fifth photonic device 45 and the sixth photonic device 46 includes at least one light emitting device, light receiving device, or optical coupler. In addition, each of the fifth photonic device 45 and the sixth photonic device 46 performs the same function as a selected one of the first photonic device 41, the second photonic device 42, the third photonic device 43, and the fourth photonic device 44.

The fourth optical coupling wire 24 is designed to be formed in the same manner and to perform the same function as the first optical coupling wire 21. The fourth optical coupling wire 24 is designed to be materially matched with the fifth photonic device 45 at a portion in contact with the fifth photonic device and the sixth photonic device 46 at a portion in contact with the sixth photonic device 46 in at least one selected of physical, mechanical, thermal, and optical properties. In addition, the fourth optical coupling wire 24 may be formed by adjusting the amount of material in the middle portion to have physical, mechanical, thermal, or optical properties that correspond to an intermediate degree of the properties exhibited at both ends, and the middle portion may be formed with a separate layer for convenience in the manufacturing process.

The first intermediate layer 71 is designed to be matched with a portion that serves as an incident surface or an exit surface of the fifth photonic device 45 in at least one selected of physical, mechanical, thermal, and optical properties, and the second intermediate layer 72 is designed to be matched with a portion that serves as an incident surface or an exit surface of the sixth photonic device 46 in at least one selected of physical, mechanical, thermal, and optical properties.

The first intermediate layer 71 may be formed as a layer including at least one homogeneous material. For example, the first intermediate layer 71 may be designed to have a thickness that is 0.25 times the wavelength of the optical signal passing through the first intermediate layer 71. In this case, the refractive index of the first intermediate layer 71 is designed to be the geometric mean of the refractive index at the end of the fourth optical coupling wire 24 in close contact with the first intermediate layer 71 and the refractive index at the surface of the fifth photonic device 45 in close contact with the first intermediate layer 71.

The second intermediate layer 72 may also be formed as a layer including at least one homogeneous material, similar to the first intermediate layer 71. The second intermediate layer 72 may be designed to have a thickness equal to 0.25 times the wavelength of the optical signal passing through the second intermediate layer 72. In this case, the refractive index of the second intermediate layer 72 is designed to be the geometric mean of the refractive index at the end of the fourth optical coupling wire 24 in close contact with the second intermediate layer 72 and the refractive index at the surface of the sixth photonic device 46 in close contact with the second intermediate layer 72.

By forming the closed fourth optical coupling wire 24 to precisely couple the two points, i.e., the fifth and sixth photonic devices 45 and 46, using the above method, the optical module according to an embodiment of the present invention is capable of further improving the optical coupling efficiency and achieve higher optical signal-to-noise performance.

FIG. 13 is a diagram for explaining the concept of an optical module including an intermediate layer formed at the connection area of an optical coupling wire connecting between a photonic device formed to have an optical signal incident and exit directions, which are different from each other, and an optical waveguide according to an embodiment of the present invention.

The first intermediate layer 71 and the second intermediate layer 72 may be composed of silicon nitride silicon nitride containing $Si_3N_4$, silicon oxide containing $SiO_2$, or SiON material. Alternatively, it may be a multilayer composite structure containing one or more materials selected from $Ta_2O_5$, $TiO_2$, and $SiO_2$. Therefore, the first and second intermediate layers 71 and 72 may contain materials with physical, mechanical, thermal, and optical properties, and may contain materials different from the optical coupling wire. Such materials may be formed using typical semiconductor processes.

However, it is not necessarily limited thereto, and the first and second intermediate layers 71 and 72 may be formed by the same method as the optical coupling wire using materials containing polymers similar to the optical coupling wire material.

With reference to part (a) of FIG. 13, the optical module including an intermediate layer formed at the connection area of an optical coupling wire connecting between an photonic device formed to have optical signal incident and exit directions, which are different from each other, and an optical waveguide according to an embodiment of the present invention includes a seventh substrate S7, a seventh photonic device 47, a second electronic device 92, a third optical waveguide 63, a fifth optical coupling wire 25, a second electrical wiring 94, a third intermediate layer 73, and a fourth intermediate layer 74. (b) of FIG. 13 shows the structure of part 99.

The seven substrate S7 is made of the same material as the first substrate S1 and performs the same function. To support various photonic and electronic devices, it is made of a flat and solid material and exchanges various electrical signals to perform complex functions. Here, the electrical signals include power signals for power supply, communication signals for communication with external communication devices, and high-speed electrical signals for high-speed data transfer. To this end, it is preferable that the seventh substrate S7 is a printed circuit board consisting of multiple layers.

The seventh substrate 47 is made of the same material as the fourth substrate 44 and performs the same function. It is preferable for the seventh photonic device 47, when transmitting optical signals through the third optical waveguide 63, to be a high-speed electro-optical conversion device capable of generating optical signals in the opposite direction of the seventh substrate S7 and, when receiving optical signals from the third optical waveguide 63, to be a high-speed photoelectric conversion device capable of receiving optical signals directed towards the seventh substrate S7.

The second electronic device 92 is an electronic device for assisting driving of the seventh photonic device 47, includes at least one semiconductor integrated circuit manufactured through a semiconductor process, and performs the same function as the first electronic device 91 for the seventh photonic device 47.

The third optical waveguide 63 includes at least one optical waveguide and is formed to include a core and cladding to transmit received optical signals to the outside without noise and loss. The third optical waveguide 63 may perform the same function as the first optical waveguide 61.

The fifth optical coupling wire 25 may perform the same function and be made of the same material as the third optical coupling wire 23. When the seventh photonic device 47 and the third optical waveguide 63 are plural, the fifth optical coupling wire 25 also includes a necessary number of optical coupling wires for connection therebetween. The fifth optical coupling wire 25 is designed to be materially matched with the seventh photonic device 47 at a portion in contact with the seventh photonic device 47 and the third optical waveguide 63 at a portion in contact with the third optical waveguide 63 in at least one selected of physical, mechanical, thermal, and optical properties. In addition, the fifth optical coupling wire 25 may be formed by adjusting the amount of material in a predetermined portion to have physical, mechanical, thermal, or optical properties that correspond to an intermediate degree of the properties exhibited at both ends, and the corresponding portion may be formed with a separate layer for convenience in the manufacturing process.

The second electrical wiring 94 is formed to include at least one electrical wiring and is used to supply power from the second electronic device 92 to the seventh photonic device 47 or to apply a high-speed driving signal. In addition, the second electrical wiring 94 serves as a medium for transmitting high-speed electrical signals that are opto-electrically converted in the seventh photonic device 47 to the first electronic device 92.

The third intermediate layer 73 is designed to be matched with a portion that serves as an incident surface or an exit surface of the seventh photonic device 47 in at least one selected of physical, mechanical, thermal, and optical properties, and the fourth intermediate layer 74 is designed to be matched with a portion that serves as an incident surface or an exit surface of the third optical waveguide 63 in at least one selected of physical, mechanical, thermal, and optical properties.

The third intermediate layer 73 may be formed as a layer including at least one homogeneous material. For example, the third intermediate layer 73 may be designed to have a thickness that is 0.25 times the wavelength of the optical signal passing through the third intermediate layer 73. In this case, the refractive index of the third intermediate layer 73 is designed to be the geometric mean of the refractive index at the end of the fifth optical coupling wire 25 in close contact with the third intermediate layer 73 and the refractive index at the surface of the seventh photonic device 47 in close contact with the third intermediate layer 73.

The fourth intermediate layer 74 may also be formed as a layer including at least one homogeneous material, similar to the third intermediate layer 73. The fourth intermediate layer 74 may be designed to have a thickness equal to 0.25 times the wavelength of the optical signal passing through the fourth intermediate layer 74. In this case, the refractive index of the fourth intermediate layer 74 is designed to be the geometric mean of the refractive index at the end of the fifth optical coupling wire in close contact with the fourth intermediate layer 74 and the refractive index at the surface of the third optical waveguide 63 in close contact with the fourth intermediate layer 74.

In addition, the fifth optical coupling wire 25 may be formed in a manner integrated with or separated from the third and fourth intermediate layers 73 and 74 through a single process or a plurality of processes.

By forming the closed fifth optical coupling wire 25 to precisely couple the two points, i.e., the seventh photonic device 47 and the third optical waveguide 63, using the above method, the optical module according to an embodiment of the present invention is capable of further improving the optical coupling efficiency and achieve higher optical signal-to-noise performance.

Figure 14:
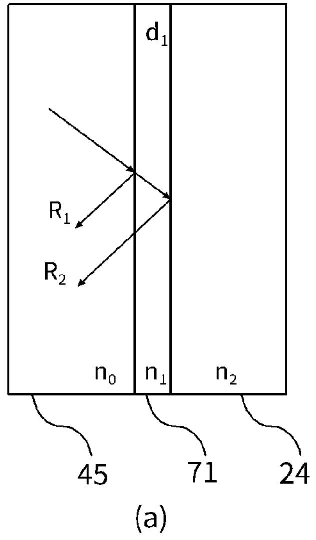
FIG. 14 is a diagram for explaining the concept of an intermediate layer composed of a plurality of layers included in an optical module with improved optical coupling efficiency according to an embodiment of the present invention.
Figure 14:
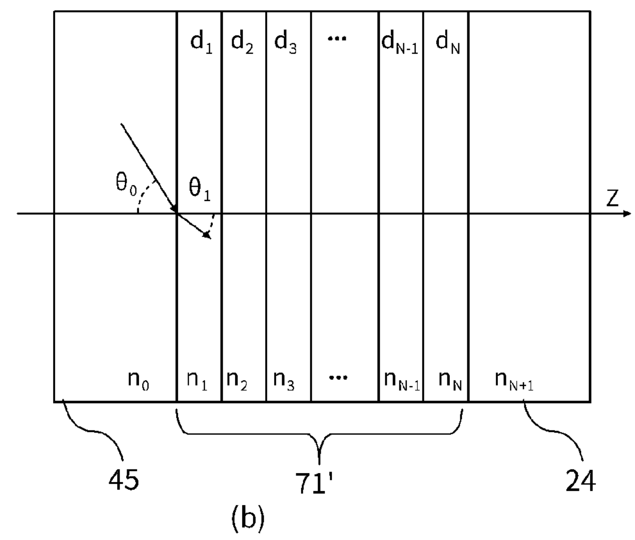

FIG. 14 is a diagram for explaining the concept of an intermediate layer composed of a plurality of layers included in an optical module with improved optical coupling efficiency according to an embodiment of the present invention.

Part (a) of FIG. 14 illustrates the fifth photonic device 45, the first intermediate layer 71, and the fourth optical coupling wire 24 from the perspective of the optical signal emitted from the fifth photonic device 45 in the configuration of the optical module that improves the optical coupling efficiency according to an embodiment of FIG. 12, as shown in FIG. 12. The optical signal emitted from the fifth photonic device 45 and traveling towards the fourth optical coupling wire 24 undergoes reflection and refraction as it encounters the first intermediate layer 71, which is a different material or medium than the fifth photonic device 45, and undergoes reflection and refraction again as it encounters the fourth optical coupling wire 24, which is another material or medium.

Here, by designing and forming the first intermediate layer 71 to be matched with the fifth photonic device 45 and the fourth optical coupling wire 24 in physical, mechanical, thermal, or optical properties, it is possible to achieve more improved optical coupling efficiency and optical signal-to-noise performance.

Within this structure, the optical signal may be reflected (R1) at the first interface between the fifth photonic device 45 and the first surface of the first intermediate layer 71, and then again reflected (R2) at the second interface between the second surface of the first intermediate layer 71 and the fourth optical coupling wire 24. Assuming that the intensity of the optical signal reflected and returning towards the fifth photonic device 45 can be calculated as the sum of R1 and R2, it may be possible to design the first intermediate layer 71 to minimize and eliminate reflection by canceling out R1 and R2.

The thickness of the first intermediate layer 71 is designed to be 0.25 times the wavelength of the optical signal passing through the first intermediate layer 71, and the refractive index of the first intermediate layer 71 is designed to be the geometric mean of the refractive indices of the fifth photonic device 45 and the fourth optical coupling wire 24, respectively. For example, when the wavelength of the optical signal passing through the first intermediate layer 71 is 850 nm, and the refractive indices of the fifth photonic device 45 and the fourth optical coupling wire 24 are 3.0 and 1.5, respectively, at 850 nm wavelength in vacuum (or air), the refractive index and thickness of the first intermediate layer 71 may be formed to be 2.12 and 100.2 nm, respectively.

Here, it is preferable for the first intermediate layer 71 to be in complete contact and bonded without any space like an air layer between the contact surfaces with the fifth photonic device 45 and the fourth optical coupling wire 24.

Part (b) of FIG. 14 illustrates the fifth photonic device 45, the first intermediate layer 71', and the fourth optical coupling wire 24 from the perspective of the optical signal emitted from the fifth photonic device 45 in the configuration of the optical module that improves the optical coupling efficiency according to an embodiment of the present invention, as shown in FIG. 12. The optical signal emitted from the fifth photonic device 45 and traveling towards the fourth optical coupling wire 24 undergoes reflection and refraction as it encounters the first intermediate layer 71', which is a different material or medium than the fifth photonic device 45, and undergoes reflection and refraction again as it encounters the fourth optical coupling wire 24, which is another material or medium.

In contrast to the configuration shown in part (a) of FIG. 14, the first intermediate layer 71' is composed of a plurality of layers different in refractive index and thickness. Like the first intermediate layer 71 in part (a) of FIG. 14, the plurality of layers with different refractive indices and thicknesses may be designed in the first intermediate layer 71' such that the intensities of all optical signals reflected at N layers and reflected back towards the fifth photonic device 45 is canceled out to sum up to zero.

Hereinafter, the formation of the optical coupling wire included in the optical module that improves the optical coupling efficiency according to an embodiment of the present invention will be described using the optical module shown in FIG. 12. The fourth optical coupling wire 24, which is included in the optical module of FIG. 12, starts to be formed by being closely in contact with the surface of the fifth photonic device 45 or the surface of the first intermediate layer 71, and is then extended away from the contacted surface towards the surface of the sixth photonic device 46 or the surface of the second intermediate layer 72, where it may be closely in contact to complete its formation and connection.

For the convenience of the manufacturing process, when the fourth optical coupling wire 24 begins to form by closely contacting the surface of the fifth photonic device 45 or the surface of the first intermediate layer 71, the ejection of the solution may be terminated to pre-form a separate end portion. For example, as shown in FIGS. 12 and 13, the first intermediate layer 71, second intermediate layer 72, third intermediate layer 73, and fourth intermediate layer 74 may also serve as the end portion of the optical coupling wire, which is formed in close contact with each of the intermediate layers.

The optical coupling wire included in the optical module that improves the optical coupling efficiency according to one embodiment of the present invention may be produced using a micropipette capable of expelling a solution in which the material for forming the optical coupling wire is dissolved through a nozzle with a diameter ranging from several nm to several hundred μm under predetermined conditions.

A micropipette with a nozzle having a diameter similar in size to the diameter of the end portion of the fourth optical coupling wire 24 desired to be fabricated is prepared. Here, it is preferable that the diameter of the micropipette nozzle is similar to or the same as the exit surface diameter of the fourth optical coupling wire 24 on the first optical medium 71 or the fifth photonic device 45. The diameter of the fourth optical coupling wire 24 may be controlled by reducing or increasing the ejection speed of the material forming the optical coupling wire. Alternatively, the diameter of the fourth optical coupling wire 24 may be adjusted by decreasing or increasing the relative movement speed between the micropipette and the target material being formed with the fourth optical coupling wire 24 while the ejection speed is kept constant.

Next, the solution in which the material for forming the optical coupling wire is dissolved is filled into the micropipette. The solution filled in the micropipette contains a solvent that evaporates at a predetermined rate when exposed to the material constituting the optical coupling wire and the air, and is formulated to have a viscosity flowable within and ejected from the pipette. The optical coupling wire included in the optical module that enhances the coupling efficiency according to an embodiment of the present invention may include a translucent polymer. When the solution is ejected from the nozzle, the solvent evaporates and the material forming the optical coupling wire remains, solidifying into the shape of the fourth optical coupling wire 24. Various processes such as annealing or curing the material may be added to ensure the robust maintenance of the shape of the optical coupling wire 24.

Next, the micropipette filled with the solution for forming the optical coupling wire is brought to place its nozzle close to the surface of the fifth photonic device 45 or the surface of the first intermediate layer 71. In the case, the solution for forming the optical coupling wire is ejected through the nozzle under predetermined conditions, remained on the nozzle surface by forces such as surface tension, and brought into contact with the surface of the fifth photonic device 45 or the surface of the first intermediate layer 71.

After bringing the solution for forming the optical coupling wire into contact with the surface of the fifth photonic device 45 or the surface of the first intermediate layer 71, the micropipette's nozzle is moved along a predetermined trajectory to the surface of the sixth photonic device 46 or the surface of the second intermediate layer 72, which is the destination. Here, the nozzle may be controlled to move at a speed that ensures the solution for forming the optical coupling wire, which is ejected from the nozzle, to maintain a fixed shape by solidifying during its movement.

Finally, the nozzle is brought close to the destination, i.e., the surface of the sixth photonic device 46 or the surface of the second intermediate layer 72, for the solution ejected from the nozzle for forming the optical coupling wire to be brought into contact with the surface of the sixth photonic device 46 or the surface of the second intermediate layer 72.

Meanwhile, the first intermediate layer 71 or the second intermediate layer 72 may be manufactured using the same method for forming the fourth optical coupling wire 24. The first intermediate layer 71 or the second intermediate layer 72 is formed by filling a solution containing a material therefor into a micropipette and ejecting the solution under predetermined conditions. The first intermediate layer 71 or the second intermediate layer 72 may also be manufactured using multiple micropipettes. It is possible to form the fourth optical coupling wire 24 varying in characteristics depending on the part thereof by using a micropipette filled with the material for forming the first intermediate layer 71 and another micropipette filled with the material for forming the second intermediate layer 72, with the material being quantified in a micropipette.

According to one embodiment of the present invention, it is advantageous in terms of providing a high-performance optical module with good optical signal integrity and free from optical signal reflection noise, optical signal scattering noise, and optical signal interference noise by establishing a direct connection via an optical coupling wire between photonic devices and optical waveguides included in a datacenter optical module to which a multi-channel optical transmission structure is applied.

According to another embodiment of the present invention, it is advantageous in terms of mass-production of optical modules with high-speed, high-capacity, and high-density capabilities at low cost by achieving high productivity and high yield simultaneously without using expensive precision equipment or measuring instruments.

The various and beneficial advantages and effects of this invention are not limited to the above, and will be more easily understood in the process of describing the specific embodiments of this invention.

The above description is only an illustrative example of the technical idea of the present invention, and those skilled in the art to which the present invention belongs will be able to make various modification and changes without departing from the subject matter of the embodiments. Therefore, the disclosed embodiments are not intended to limit but to describe the technical idea of the embodiments, and the scope of the technical idea of the embodiments is not limited by the embodiments. The scope of protection of embodiments shall be construed by the following claims, and all technical ideas within the scope equivalent thereto shall be construed as being within the scope of the rights of the embodiments.

DESCRIPTION OF REFERENCE NUMERALS 1A, 1B, 1C, 1D, 1E, 1F, 1G, 1H: optical signal noise generation interface
100, 100': light emitting device
110: transmitter lens assembly
111, 111': first transmitter lens unit
112: second transmitter lens unit
113: transmitter reflection unit
120: receiver lens assembly
123: first receiver lens unit
124, 124': second receiver lens unit
125: receiver reflection unit
21: first optical coupling wire
21G, 21G-1, 21G-2, 21G-N: first optical coupling wire group
22: second optical coupling wire
23: third optical coupling wire
24: fourth optical coupling wire
25: fifth optical coupling wire
26: sixth optical coupling wire
41: first photonic device
41G, 41G-1, 41G-2, 41G-N: first photonic device group
42: second photonic device
42G, 42G-1, 42G-2, 42G-N: second photonic device group
43: third photonic device
44: fourth photonic device
45: fifth photonic device
46: sixth photonic device
51: first optical coupler
52: second optical coupler
61: first optical waveguide
62: second optical waveguide
63: third optical waveguide
68: optical interposer
71, 71': first intermediate layer
72: second intermediate layer
73: third intermediate layer
74: fourth intermediate layer
91: first electronic device
92: second electronic device
93: first electrical wiring
94: second electrical wiring
300, 300': light receiving device
P1, P2, P2, P3, P4, P5, P6: Optical port
S, S': substrate
S1: first substrate
S2: second substrate
S3: third substrate
S4: fourth substrate
S5: fifth substrate
S6: sixth substrate
S7: seventh substrate

What is claimed is:

1. An optical module comprising:

a first photonic device comprising a first emitting surface emitting an optical signal having a predetermined wavelength and intensity;

a second photonic device comprising a first incident surface where the optical signal having the predetermined wavelength and intensity is incident;

a first intermediate layer comprising a first receiving surface receiving the optical signal delivered from the first photonic device and a first transmitting surface transmitting the optical signal to an outside and formed with a material having at least one of predetermined physical, mechanical, thermal, and optical properties between the first emitting surface and the first incident surface for transmission of the optical signal passing through the first receiving surface and the first transmitting surface;

an optical coupling wire comprising a first end formed with a predetermined first shape and first material in contact with the first transmitting surface, a second end formed with a predetermined second shape and second material in contact with the second photonic device, and an intermediate wire unit formed to connect the first end and the second end without interruption for transmitting the optical signal received through the first end to the second end; and a second intermediate layer comprising a second receiving surface receiving the optical signal delivered from the optical coupling wire and a second transmitting surface transmitting the optical signal to an outside and formed with a material having at least one of predetermined physical, mechanical, thermal, or optical properties between the second transmitting surface and the first incident surface for transmission of the optical signal passing through the second receiving surface and the first incident surface, wherein the first receiving surface of the first intermediate layer is in direct contact with the first photonic device and the first transmitting surface of the first intermediate layer is in direct contact with the optical coupling wire, and wherein the second receiving surface of the second intermediate layer is in direct contact with the optical coupling wire and the second transmitting surface of the second intermediate layer is in direct contact with the second photonic device.

2. The optical module of claim 1, wherein the first intermediate layer is designed based on a refraction and reflection that the optical signal incident to the first incident surface undergoes between the first receiving surface and the first emitting surface or the refraction and reflection that the optical signal transmitted to the first transmitting surface undergoes between the first transmitting surface and the first end.

3. The optical module of claim 2, wherein the first intermediate layer is formed to have a refractive index equal to a geometric mean of refractive indices of the first emitting surface and the first end and a thickness equal to 0.25 times the wavelength of the optical signal passing through the first intermediate layer.

4. The optical module of claim 1, wherein the second intermediate layer is designed based on a refraction and reflection that the optical signal incident to the second receiving surface undergoes between the second end and the second receiving surface or the refraction and reflection that the optical signal transmitted to the second transmitting surface undergoes between the second transmitting surface and the first incident surface.

5. The optical module of claim 4, wherein the second intermediate layer is formed to have a refractive index equal to a geometric mean of refractive indices of the second end and the first incident surface and a thickness equal to 0.25 times the wavelength of the optical passing through the second intermediate layer.

6. The optical module of claim 1, wherein the first photonic device comprises a semiconductor laser diode configured to convert an electrical signal into an optical signal by receiving an electrical energy from the outside or an optical coupler configured to control an optical coupling efficiency of the optical signal.

7. The optical module of claim 1, wherein the second photonic device comprises a semiconductor optical diode configured to covert an optical signal into an electrical signal by receiving an electrical energy from the outside or an optical coupler configured to control an optical coupling efficiency of the optical signal.

8. The optical module of claim 1, wherein the first intermediate layer and the first end are each formed continuously without any interruption for the optical signal passing through the first intermediate layer and the first end experience no discontinuity.

9. The optical module of claim 8, wherein the first intermediate layer and the first end are formed integrally.

10. The optical module of claim 1, wherein the second end and the second intermediate layer are each formed continuously without any interruption for the optical signal passing through the second end and the second intermediate layer experience no discontinuity.

11. The optical module of claim 10, wherein the second intermediate layer and the second end are formed integrally.

12. The optical module of claim 1, further comprising:

a power supply unit configured to supply an electrical energy to the first and second photonic devices;

a modulation unit configured to directly apply an electrical signal to the first photonic device or adjust an optical absorption coefficient of an optical path through which the optical signal emitted from the photonic device, by receiving power from the power supply unit, to change a waveform of the optical signal emitted from the first photonic device;

an amplification unit configured to change a waveform of the electrical signal generated via conversion at the second photonic device by receiving an electrical energy from the power supply unit; and a control unit configured to control the power supply unit, the modulation unit, and the amplification unit.

13. An optical module comprising:

a first photonic device comprising a first emitting surface emitting an optical signal having a predetermined wavelength and intensity;

an optical waveguide configured to transmit the optical signal received through a first optical waveguide surface to a position located at a predetermined distance without loss and distortion;

a first intermediate layer comprising a first receiving surface receiving the optical signal incident from the first photonic device and a first transmitting surface transmitting the optical signal to an outside and formed with a material having at least one of predetermined physical, mechanical, thermal, and optical properties between the first emitting surface and the first incident surface for smooth transmission of the optical signal passing through the first receiving surface and the first transmitting surface;

an optical coupling wire comprising a first end formed with a predetermined first shape and first material in contact with the first transmitting surface, a second end formed with a predetermined second shape and second material in contact with the second photonic device, and an intermediate wire unit formed to connect the first end and the second end without interruption for transmitting the optical signal received through the first end to the second end; and a second intermediate layer comprising a second receiving surface receiving the optical signal emitted from the optical coupling wire and a second transmitting surface transmitting the optical signal to an outside and formed with a material having at least one of predetermined physical, mechanical, thermal, and optical properties between the second transmitting surface and the first optical waveguide surface for transmission of the optical signal passing through the second receiving surface and the first incident surface, wherein the first receiving surface of the first intermediate layer is in direct contact with the first photonic device and the first transmitting surface of the first intermediate layer is in direct contact with the optical coupling wire, and wherein the second receiving surface of the second intermediate layer is in direct contact with the optical coupling wire and the second transmitting surface of the second intermediate layer is in direct contact with the optical waveguide.

* * * * *